UNITED STATES PATENT OFFICE.

HENRY BOWER AND WILLIAM L. ROWLAND, OF PHILADELPHIA, PENNSYLVANIA; SAID ROWLAND ASSIGNOR TO SAID BOWER.

PROCESS OF OBTAINING FERROCYANIDES FROM GAS-LIQUOR.

SPECIFICATION forming part of Letters Patent No. 259,802, dated June 20, 1882.

Application filed April 22, 1882. (No specimens.)

*To all whom it may concern:*

Be it known that we, HENRY BOWER and WILLIAM L. ROWLAND, both of the city and county of Philadelphia, in the State of Pennsylvania, have jointly invented a certain new and useful Process for Obtaining Ferrocyanides from Gas-Liquor, of which process the following is a specification.

The object of our invention is to enable ferrocyanide of iron, and also ammonia, to be readily and economically produced upon a commercial scale from the ammoniacal liquor of gas-works; and to this end our invention consists in a process of adding iron, or a salt thereof, to ammoniacal liquor in a cold state, subsequently adding lime, subjecting the mixture to heat and agitation in a still or treating-vessel, and extracting the ferrocyanides from the settlings or sediment by the use of an alkaline salt, all as hereinafter more fully set forth.

We have found that by the addition of iron or an iron salt to gas-liquor in a cold condition, and before being heated or boiled or distilled, and by the subsequent addition of lime, the decompositions that take place produce not only ferrocyanide of ammonia which is soluble, but also a ferrocyanide which is insoluble, and is therefore contained in the settlings of the lime as run from a still or heating-vessel, such as is used in the treatment of ammoniacal liquors of the gas-works. If a smaller amount of the iron salt is added to the liquor than is necessary to decompose all the sulphides present, the ferrocyanides are partially soluble, but may be rendered insoluble by subsequent boiling and agitation. The ferrocyanides are extracted from the settlings by the use of any alkali, or a salt thereof, producing either ferrocyanide of potassium, sodium, or ammonia. These may be in turn precipitated by the usual methods with iron salt, yielding Prussian blue of a purer character than that obtained by precipitating the ferrocyanide of calcium which may exist in the liquor as drawn off from the still, as in such latter case a large amount of lime is carried down mechanically in the precipitation of the Prussian blue, which it is very difficult to recover in any degree of purity.

To carry out our invention, we take the ammoniacal liquor, and while cold, and before having been heated or subjected to the action of acid, add to said liquor metallic iron or a salt of iron. We then run the mixture into a still or treating-vessel provided with proper means for agitating its contents—as stirrers or steam-jet pipes—add lime in the usual proportions requisite to evolve the ammonia, and distill off the latter by the application of heat and agitation. We next draw off the liquor from the still and separate from it by filtration the settlings or sediment, which contains the desired ferrocyanide. This we extract from the settlings by heating with an alkaline salt—such as potassium or sodium carbonate—producing an alkaline ferrocyanide from which Prussian blue may be precipitated with an iron salt in the usual manner.

We are aware that the production of ferrocyanide of ammonia by the addition of iron to ammoniacal liquor has been heretofore known, and such, therefore, we do not broadly claim.

We claim as our invention and desire to secure by Letters Patent—

The improvement in the process of obtaining ferrocyanides from ammoniacal liquor treated with iron and lime, as described, which consists in extracting the ferrocyanides from the sediment of the liquid by the addition of an alkaline salt.

HENRY BOWER.
WILLIAM L. ROWLAND.

Witnesses:
J. SNOWDEN BELL,
HAROLD V. CLEARER.